US008881460B2

(12) United States Patent
Bouthillier

(10) Patent No.: US 8,881,460 B2
(45) Date of Patent: *Nov. 11, 2014

(54) SLIDING DOOR SYSTEM FOR GLASS DOORS

(75) Inventor: Serge Bouthillier, Ste-Marthe-sur-le-Lac (CA)

(73) Assignee: Groupe VFG Inc., Bois-de-Filion, Quebec (CA)

( * ) Notice: Subject to any disclaimer, the term of this patent is extended or adjusted under 35 U.S.C. 154(b) by 483 days.

This patent is subject to a terminal disclaimer.

(21) Appl. No.: 12/478,324

(22) Filed: Jun. 4, 2009

(65) Prior Publication Data

US 2010/0307063 A1    Dec. 9, 2010

(51) Int. Cl.
*E05D 13/00* (2006.01)

(52) U.S. Cl.
USPC .................... 49/409; 49/410; 49/411; 49/426

(58) Field of Classification Search
USPC ............................. 49/409, 410, 411, 425, 426
See application file for complete search history.

(56) References Cited

U.S. PATENT DOCUMENTS

| 293,991 | A | * | 2/1884 | Voorhis et al. .................. 49/426 |
| 1,737,360 | A | * | 11/1929 | Disbro ............................ 16/107 |
| 3,346,993 | A | * | 10/1967 | Johnson ........................... 49/409 |
| 5,121,817 | A | * | 6/1992 | Garrido et al. ................ 187/313 |
| 5,450,693 | A | * | 9/1995 | Tarrega ........................... 49/411 |
| 6,865,848 | B2 | * | 3/2005 | Krimmel ......................... 49/409 |
| 7,637,059 | B2 | * | 12/2009 | Chang et al. .................... 49/425 |
| 7,752,810 | B2 | * | 7/2010 | Haab et al. ....................... 49/409 |
| D626,252 | S | * | 10/2010 | Bouthillier ..................... D25/48 |
| D626,254 | S | * | 10/2010 | Bouthillier .................. D25/126 |
| D629,124 | S | * | 12/2010 | Bouthillier .................. D25/126 |
| 2003/0172592 | A1 | * | 9/2003 | Krimmel ......................... 49/409 |
| 2007/0283640 | A1 | * | 12/2007 | Shivak et al. ................... 52/207 |

FOREIGN PATENT DOCUMENTS

| EP | 1136642 A2 | 9/2001 |
| WO | 02/086267 A1 | 10/2002 |

* cited by examiner

*Primary Examiner* — Gregory J. Strimbu
(74) *Attorney, Agent, or Firm* — Norton Rose Fulbright Canada LLP

(57) ABSTRACT

A sliding door system comprises a door made of a glass panel. Roller units are connected to the door and project from a plane of the door. A structural transom has a glass panel body with main surfaces of the glass panel body positioned generally vertically. The glass panel body has at least one slot defined therein having a lower edge surface and an upper edge surface. The slot has a height for receiving a portion of the roller units between the lower edge surface and the upper edge surface, and a length for allowing a translation of the door to open and close an opening by movement of the roller units in the slot.

5 Claims, 5 Drawing Sheets

SLIDING DOOR SYSTEM FOR GLASS DOORS

FIELD OF THE APPLICATION

The present application relates to sliding door systems for glass doors, and more particularly to a roller unit to support the glass door and allow the sliding motion of the door.

BACKGROUND OF THE ART

Nowadays, glass and similar see-through or translucent materials are used as structural components. In that glass allows light to pass through, doors, walls and structures made from glass represents an esthetic and elegant solution. However, in these instances, the glass components must have minimum thicknesses, as they serve a structural function.

Accordingly, hinges and sliding door mechanisms must be capable of handling the weight of movable components (e.g., doors). On the other hand, due to the highly esthetic value of glass doors and structures, and the fact that they are often transparent, sliding door mechanisms must be visually appealing.

SUMMARY OF THE APPLICATION

It is therefore an aim of the present disclosure to provide a novel roller unit for use with glass sliding door systems.

It is a further aim of the present disclosure to provide a sliding door system for glass doors that addresses issues associated with the prior art.

Therefore, in accordance with the present application, there is provided a roller unit for a sliding door comprising: a connector assembly adapted to be secured to a structure or to a door, the connector assembly comprising a spindle; and a wheel having a rolling-element bearing operationally mounted to the spindle of the connector assembly, and an annular wheel body mounted to the rolling-element bearing for rotation about the spindle, the annular wheel body having a pair of flanges separated by a groove on a circumferential surface of the annular wheel body, the circumferential surface defining a shape corresponding to the shape of an edge portion of the door or structure engaged in the annular wheel body, the connector assembly being connected to one of the door and the structure while the wheel receives an edge portion of the other of the door and the structure, whereby the roller unit holds the door and structure face to face while allowing sliding movement of the door with respect to the structure by rotation of the wheel about the spindle.

Further in accordance with the present application, there is provided a sliding door system comprising: at least one door; a transom adapted to be secured to a structure above a door opening in the structure, the transom comprising top and bottom edge surfaces each having a pair of longitudinal slanted edge surfaces separated by a longitudinal flat edge surface; at least two roller units secured to the door with at least one said roller unit operationally contacting the top edge surface of the transom, and at least one said roller unit operationally contacting the bottom edge surface of the transom, each said roller unit comprising: a connector assembly secured to the door, the connector assembly comprising a spindle, and a wheel having a bearing operationally mounted to the spindle of the connector assembly, and an annular wheel body mounted to the bearing for rotation about the spindle, the annular wheel body having a pair of flared-surface flanges separated by a groove on a circumferential surface of the annular wheel body to correspond to the shape of edge surfaces of the transom engaged in the annular wheel body, with the width of the longitudinal slanted edge surface of the transom adjacent the structure being at least equal to the width of the roller unit from the corresponding flared-surface flange to an end of the roller unit; whereby the roller units hold the door and structure face to face while allowing sliding movement of the door with respect to the structure by rotation of the wheels about the spindle to open/close the opening in the structure.

DESCRIPTION OF THE PREFERRED EMBODIMENTS

Figure 1:
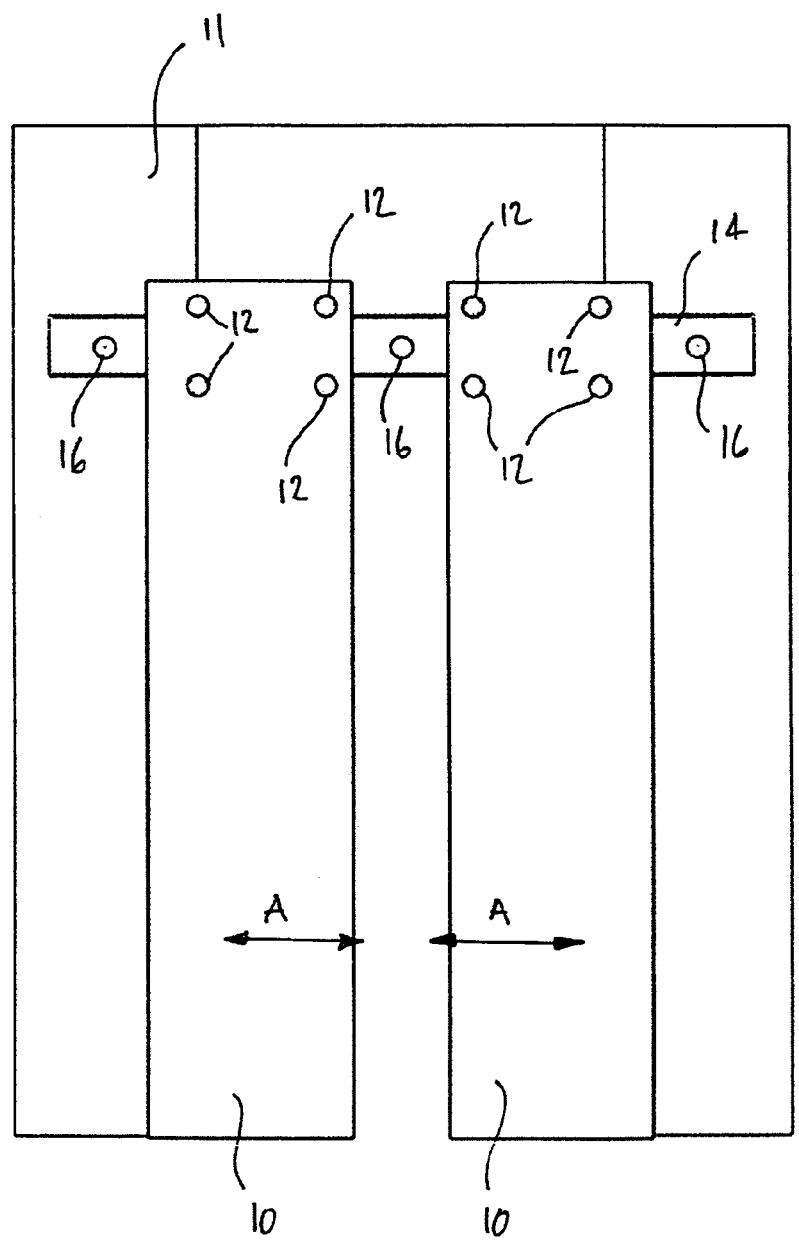
FIG. 1 is a front view of a sliding door system in accordance with an embodiment of the present disclosure.

Referring to the drawings and more particularly to FIG. 1, a sliding door system in accordance with the present disclosure is generally shown having a pair of sliding doors 10 made of glass panels, or any other suitable panel material, or any combination of see-through or translucent materials and structural materials (e.g., wood, metal). The sliding doors 10 translate to open/close an opening in a structure 11, in the directions shown by A. The structure 11 is typically made of glass panels as well, but may also consist of any other suitable materials or combination of materials.

The doors 10 are top-hung by roller units 12 to a transom 14. The transom 14 may be part of the structure 11, and typically made of glass panels as well, but may also consist of other materials. The transom 14 is secured to the structure 11 by connectors 16, above a door opening defined by the structure 11. Although the transom 14 is illustrated as being supported by three of the connectors 16, more or fewer connectors 16 may be used.

In FIG. 1, the doors 10 are each shown supported by a set of four roller units 12. However, any appropriate number of roller units 12 may be used to support a sliding door. Moreover, the roller units 12 are not restricted to being used with a top-hung sliding door as in FIG. 1, as will be described hereinafter. For instance, the roller units 12 may support a bottom edge of sliding panels, amongst other possibilities.

Figure 2:
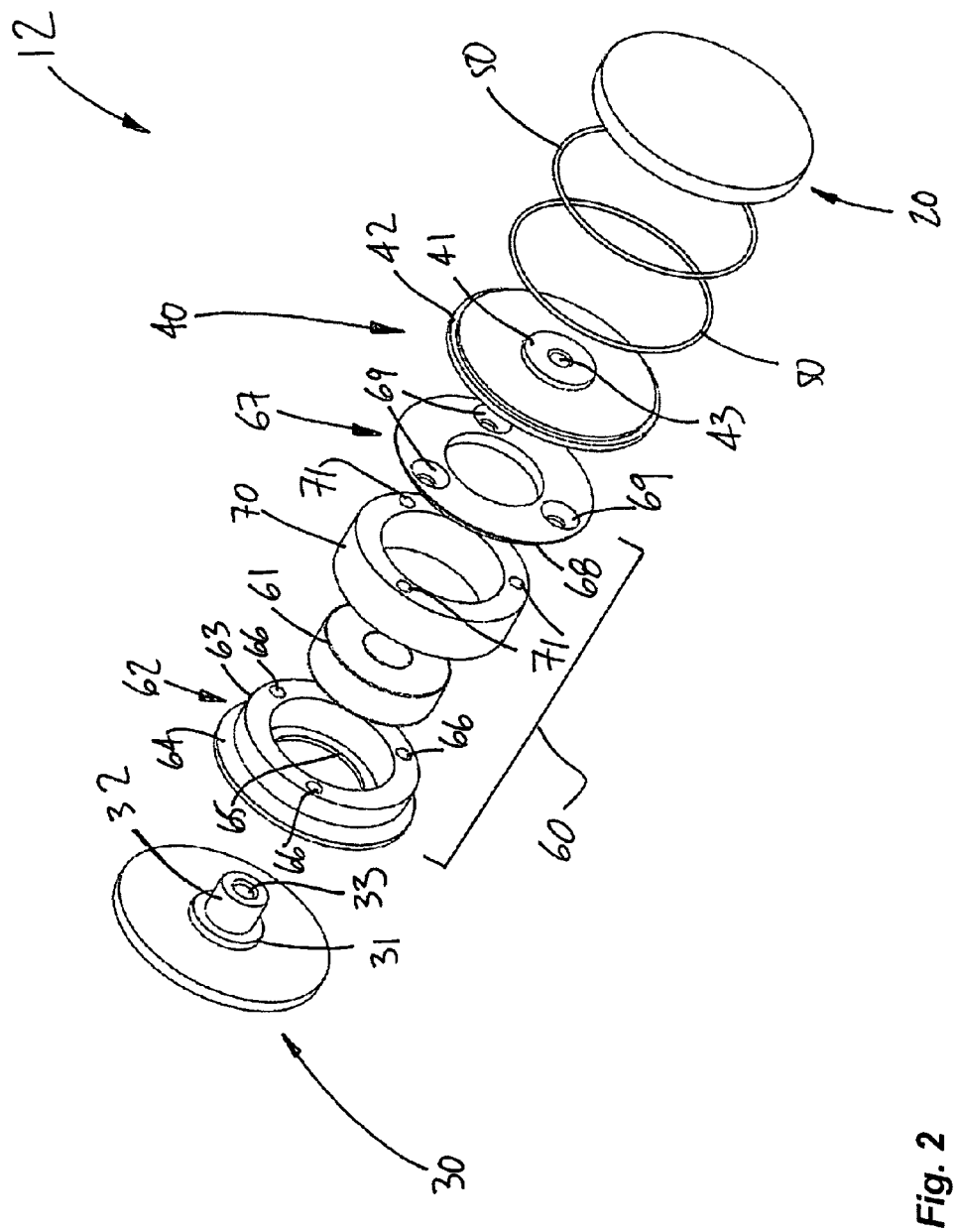
FIG. 2 is an exploded view of a roller unit of the sliding door system of FIG. 1, with a spacer.
Figure 3:
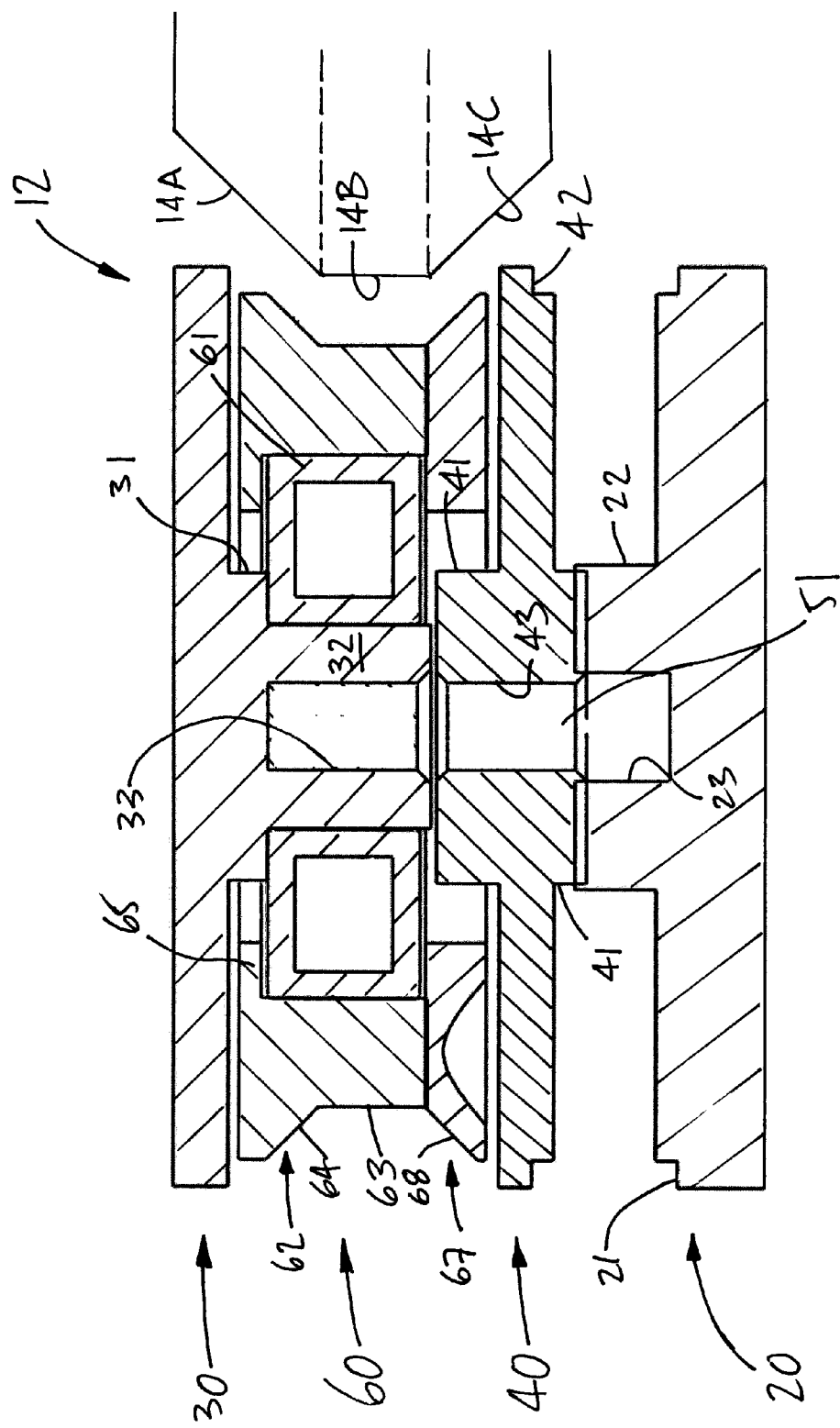
FIG. 3 is a sectional view of the roller unit of FIG. 2, without a spacer.

Referring concurrently to FIGS. 2 and 3, one of the roller units 12 is shown in greater detail. The roller unit 12 has a connector assembly rotatably supporting a wheel. The roller unit 12 has an end cap 20. The end cap 20 is visible when the roller unit 12 is assembled to a door, whereby the end cap 20 may have any appropriate ornamental features: paint, finish, ornaments. Moreover, the end cap 20 may have other shapes than that of a disk.

Referring to FIG. 3, a shoulder 21 may be defined between a circumferential surface of the end cap 20 and one of its two circular surfaces. The shoulder 21 receives an O-ring, as will be described hereinafter.

A neck 22 projects from one of the circular surfaces of the end cap 20, and is on the same side as the shoulder 21. The neck 22 has a tapped bore 23, preferably not extending through the cap 20. In the illustrated embodiment, the neck 22 and the tapped bore 23 are concentric with the end cap 20.

Referring to FIGS. 2 and 3, another end cap 30 is provided on the opposed end of the roller unit 12. The end cap 30 is visible when the roller unit 12 is assembled to a door, whereby the end cap 20 may have any appropriate ornamental features. The end cap 30 has a neck 31, and a spindle 32 projecting concentrically form the neck 31. The neck 31 and spindle 32 are preferably concentric with the end cap 30. The spindle 32 has a tapped bore 33.

The rolling components of the roller unit 12 are positioned between the end caps 20 and 30. The end caps 20 and 30 define the visible face portions of the roller units 12.

Referring to FIGS. 2 and 3, the roller unit 12 has a middle disk 40. The middle disk 40 has a pair of necks 41 on opposite circular surfaces. A shoulder 42 may be defined between a circumferential surface of the middle disk 40 and one of the two circular surfaces. The shoulder 42 receives an O-ring, as will be described hereinafter.

A tapped throughbore 43 passes through the necks 41. Alternatively, each neck 41 may have an own tapped bore. The tapped throughbore 43 is concentric with the necks 41.

In order to secure the roller unit 12 to a bore in a structural panel or in a door, the end cap 20 and middle disk 40 are positioned on opposite sides of the bore, in such a way that the necks 22 and 41, respectively, enter into the bore and may contact one another. O-rings 50 are placed in the shoulders 21 and 42 beforehand, whereby the circular surfaces of the disks 20 and 40 do not come in direct contact with the structural panel. Moreover, the O-rings 50 are preferably made of a soft resilient material, to generally dampen transmission of vibrations between the panel and the roller unit 12. The O-rings 50 also prevent water infiltration between the disks 20 and 40 and the structural panel. The O-rings or like rings of resilient material may be received in grooves on the circular surfaces alternatively to the shoulders 21 and 42.

A threaded rod 51 interconnects the disks 20 and 40. In the embodiment of FIG. 3, the middle cap 40 has a throughbore 43, whereby the threaded rod 51 also interconnects the end cap 30 to the middle disk 40. Other constructions are also considered. For instance, the middle disk 40 may be optionally in the connector assembly. Moreover, the connector assembly may consist of any other means that is securable to a door or structure, with a spindle to rotatably support a wheel.

Referring to FIGS. 2 and 3, a wheel 60 of the roller unit 12 is between the end cap 30 and the middle disk 40. The wheel 60 has a bearing 61, which may be any suitable type of bearing (e.g., roller bearing, ball bearing), and preferably of rolling-element bearing as opposed to sleeve bearings. Alternatives to rolling-element bearings may be used as well, such as annular rings of low-friction materials (e.g., PTFE) and the like. The bearing 61 is mounted on the spindle 32 of the end cap 30, although the spindle 32 could be integral with the middle disk 40 as well.

A first wheel ring 62 has an annular body and is positioned adjacent to the end cap 30 when the roller unit 12 is assembled. The wheel ring 62 has a cylindrical surface portion 63 and a flared surface portion 64. The flared surface portion 64 is positioned adjacent to the end cap 30 when the roller unit 12 is assembled. An inner shoulder 65 projects radially inwardly from the flared surface portion 64, in the opening of the wheel ring 62. The inner shoulder 65 is provided to define a seat in the wheel ring 62 for the bearing 61.

Tapped bores 66 are defined in an axial surface of the wheel ring 62, and are used to connect a second wheel ring 67 to the first wheel ring 62.

Referring to FIGS. 2 and 3, the second wheel ring 67 has an annular body and is positioned adjacent to the middle disk 40 when the roller unit 12 is assembled. The wheel ring 67 has a flared surface portion 68. Countersink holes 69 are defined axially through the wheel ring 67, and are spaced apart so as to be in register with the tapped bores 66. Accordingly, with appropriate fasteners (e.g., with a countersunk head), the first wheel ring 62 and the second wheel ring 67 are secured to one another. An inner diameter of the wheel ring 67 is similar to that of the inner shoulder 65, and smaller than an outer diameter of the bearing 61, whereby the bearing 61 is held captive in the first wheel ring 62.

As shown in the embodiment of FIG. 2, a spacer 70 may be provided to increase the width of the wheel 60. The spacer 70 has a cylindrical ring body having an outer diameter similar to that of the cylindrical surface portion 63 of the first wheel ring 62. The width of the wheel 60 is selected as a function of the thickness of the panels. Axial throughbores 71 are defined in the spacer 70, to allow the connection of the first wheel ring 62 and the second wheel ring 67 with fasteners, as described above.

The wheel 60 therefore has the shape of a sheave, with the flared surface portions 64 and 68 acting as flanges, and the cylindrical surface portion 63, and optionally the spacer 70 forming the groove between the flanges. Accordingly, when a panel having the appropriate shape is in contact with the wheel 60, it is held captive by the sheave shape.

Although a modular construction of the wheel 60 is described, it is pointed out that the wheel 60 may be an integral piece (e.g., cast, machined, or the like). However, the modular construction allows the wheel 60 to be adapted to various thicknesses of panels (e.g., 6 mm to 25 mm), by simply selecting appropriate spacer width. Accordingly, the modular construction addresses inventory issues. It is pointed out that through the description, reference is made to tapped bores and throughbores. This includes self-tapping bores.

Now that the examples of construction of roller units have been described, a use of the roller units 12 in a door system is set forth.

Figure 4:
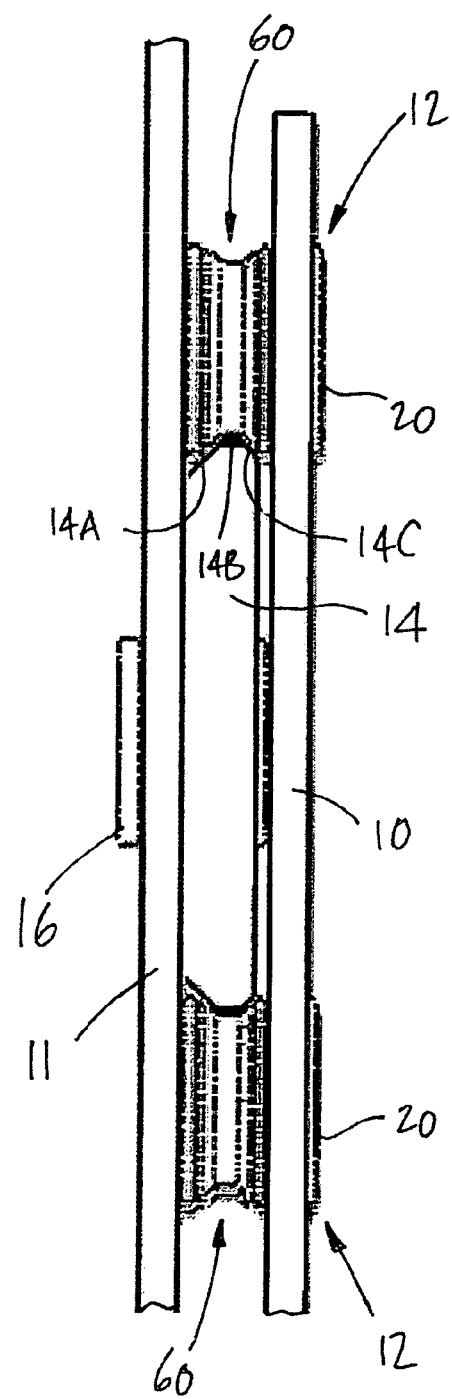
FIG. 4 is a side elevation view of a glass sliding door supported by the roller units of FIG. 2, with a transom-supported door.

Referring to FIG. 4, the door 10 is shown top-hung by roller units 12 on the transom 14. In the side view of FIG. 4, only two of the roller units 12 are visible, although more of the roller units 12 may be used (e.g., as shown in FIG. 1). There is provided roller units 12 for contact with an upper edge of the transom 14, and roller units for contact with a lower edge of the transom 14.

For esthetic and practical reasons, it is preferred that the door 10 be as close as possible to the structural panel 11. In the transom-supported configuration of FIG. 4, it is the thickness of the transom 14 that defines the gap between the door 10 and the structural panel 11. In order to minimize the width taken by the transom 14 between the door 10 and the structural panel 11, the top and bottom edge surfaces of the transom 14 have a given shape. More specifically, the top and bottom edge surfaces of the transom each have beveled edge surfaces, namely a sequence of a longitudinal slanted edge surface 14A (i.e., a beveled edge), a longitudinal flat edge surface 14B, and another longitudinal slanted edge surface 14C (i.e., another beveled edge).

Referring concurrently to FIGS. 3 and 4, when the roller units 12 contact the transom 14, the cylindrical surface portion 63 of the roller units 12 is in contact with the flat edge surface 14B, and optionally with the spacer 70 if a spacer 70 is present in the roller units 12. The roller unit 12 is selected as a function of the thickness of the transom 14, and more particularly as a function of the width of the cylindrical surface portion 63. Therefore, the flared surface portions 64 and 68 of the wheel 60 are against the slanted edge surfaces 14A and 14C when the roller units 12 are top-hung to the transom 14. It is however observed that the slanted edge surface 14A projects beyond the flared surface portion 64. The gap between the slanted edge surface 14A and the structural panel 11 accommodates a portion of the end cap 30.

Therefore, in the embodiment of FIGS. 3 and 4, the horizontal thickness of the portion of the transom 14 that features the slanted edge surface 14A is at least equal to the combined width of the flared surface portion 64 and the end cap 30. This ensures a minimum gap between the door 10 and the structural panel 11.

Similarly, the horizontal thickness of the portion of the transom 14 that features the slanted edge surface 14C is at least equal to the combined width of the flared surface portion 68 and the end disk 20. An additional space may be provided for a head of the connectors 14C, if necessary, as shown in FIG. 4. This construction allow the minimization of the gap between the door 10 and structural panel 11.

Figure 5:
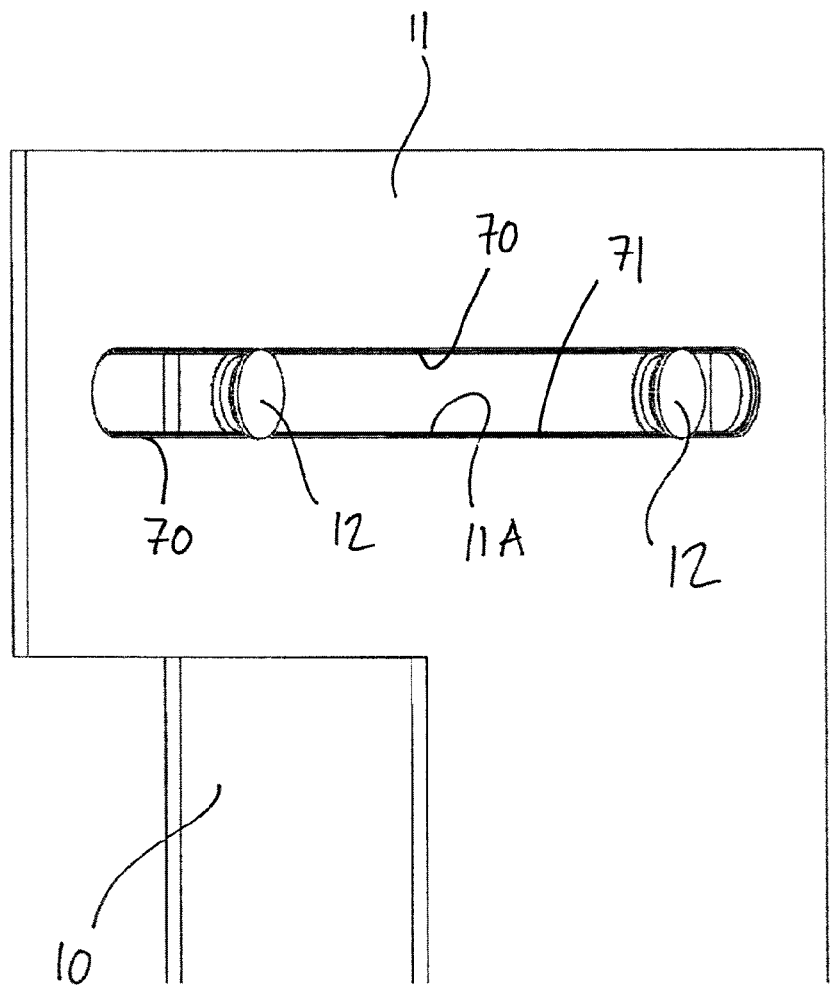
FIG. 5 is a perspective view of a glass sliding door supported by the roller units of the sliding door system of FIG. 1, with a slot-supported door.

Referring to FIG. 5, an alternative embodiment is shown in which the door 10 is top-hung by the roller units 12 to a slot 11A in the structural panel 11. The slot 11A preferably has slanted edge surfaces (one shown at 70), as was described for the top and bottom edge surfaces of the transom 14 (FIGS. 3 and 4). Therefore, the gap between the door 10 and the structural panel 11 is even further reduced with the configuration of FIG. 5.

In the embodiments of FIGS. 4 and 5, the roller units 12 roll on the edge surfaces of the transom 14 (FIG. 4) or the slot 11A (FIG. 5). The door 10 moves in a translational fashion, which is referred to as a sliding movement. Therefore, even if roller units 12 are used causing a rotational movement transmission, the door 10 is referred to as a sliding door. It is considered to install a magnetic layer 71 on the rolling edge surfaces of the transom 14 (FIG. 4) or the slot 11A (FIG. 5), to facilitate the translational movement of the door 10. Moreover, despite the fact that top-hung solutions are illustrated, it is considered to use the roller units 12 in other door-supporting configurations.

The invention claimed is:

1. A sliding door system comprising:
a door comprising a glass panel;
at least one roller unit connected to the door and projecting from a plane of the glass panel of the door, the roller unit defining a groove on a circumferential surface thereof; and
a structural transom comprising a glass panel body, main surfaces of the glass panel body positioned generally vertically, the glass panel body adapted to be supported above an opening, at least one slot defined in the glass panel body and having a lower edge surface of glass and an upper edge surface of glass vertically above and parallel to the lower edge surface, the at least one slot being generally horizontal when the glass panel body is installed, the at least one slot having a height defined between the lower edge surface and the upper edge surface, the slot receiving diametrically opposed portions of the roller unit with the lower edge surface and the upper edge surface of the slot being in the groove of the roller unit, wherein the door is supported by the structural transom via the roller unit, the slot having a length for allowing a translation of the door to open and to close the opening by movement of the at least one roller unit in the slot.

2. The sliding door system according to claim 1, further comprising at least one structural panel forming a side of the opening, the structural transom being integral with the structural panel.

3. The sliding door system according to claim 1, further comprising a magnetic layer in the slot of the structural transom, with the roller unit being magnetically attracted to the magnetic layer.

4. The sliding door system according to claim 1, wherein the lower edge surface of the at least one slot comprises slanted edge surface portions separated by a flat horizontal surface portion, and the at least one roller unit is a sheave.

5. The sliding door system according to claim 1, wherein the structural transom is connected to a structural panel.

\* \* \* \* \*